United States Patent
Mogi et al.

[19]

[11] Patent Number: 6,000,276
[45] Date of Patent: Dec. 14, 1999

[54] KNOCK DETECTION DEVICE FOR AN INTERNAL COMBUSTION ENGINE AVOIDING ERRONEOUS KNOCK DETECTION

[75] Inventors: Kazuhisa Mogi; Koichi Nakata, both of Susono; Yasuo Ito, Nagoya, all of Japan

[73] Assignees: Toyota Jidosha Kabushiki Kaisha, Aichi-ken; Denso Corporation, Kariya, both of Japan

[21] Appl. No.: 09/081,477

[22] Filed: May 19, 1998

[30] Foreign Application Priority Data

May 20, 1997 [JP] Japan .................................. 9-129988

[51] Int. Cl.⁶ .................................................. G01L 23/22
[52] U.S. Cl. .......................................... 73/35.08; 73/35.01
[58] Field of Search .............................. 73/35.08, 35.05, 73/35.07, 116; 324/459, 464, 466, 378

[56] References Cited

U.S. PATENT DOCUMENTS 5,675,072 10/1997 Yasuda et al. .

FOREIGN PATENT DOCUMENTS

| 61-57830 | 3/1986 | Japan . |
| 4-136485 | 5/1992 | Japan . |
| 5-202797 | 8/1993 | Japan . |
| 6-101562 | 4/1994 | Japan . |
| 6-159129 | 6/1994 | Japan . |
| 7-286552 | 10/1995 | Japan . |

OTHER PUBLICATIONS

U.S. application No. 08/918,384, Aoki et al., filed Aug. 26, 1997.
U.S. application No. 08/932,599, Aoki et al., filed Sep. 17, 1997.
U.S. application No. 08/923,744, Aoki et al., filed Sep. 2, 1997.
U.S. application No. 08/922400, Mogi et al., filed Sep. 3, 1997.

Primary Examiner—Christine K. Oda
Attorney, Agent, or Firm—Kenyon & Kenyon

[57] ABSTRACT

A knock detection device for an internal combustion engine make provisions to prevent erroneous decisions from being made due to a steplike signal change at the time of mask removal or to an overlap between an LC resonance generation period and a knock occurrence period in high engine rpm conditions. A low-frequency component is removed from an ion current signal by an HPF, and the resulting flat signal is supplied to a mask circuit, thereby reducing the amount of discontinuity occurring at the time of mask removal and suppressing noise in an output signal of a BPF to a level that does not affect knock detection. Further, by setting the gate period in a peak-hold circuit slightly delayed with respect to the mask removal timing, noise associated with the mask removal is completely eliminated. As mask signals used to specify the mask period, in addition to a mask signal for removing the mask when a predetermined crankshaft angle is reached, a second signal is provided for removing the mask when a prescribed time required for LC resonance noise to settle down has elapsed from the end of spark discharge, and the mask is removed only when both of the mask signals are deactivated.

1 Claim, 9 Drawing Sheets

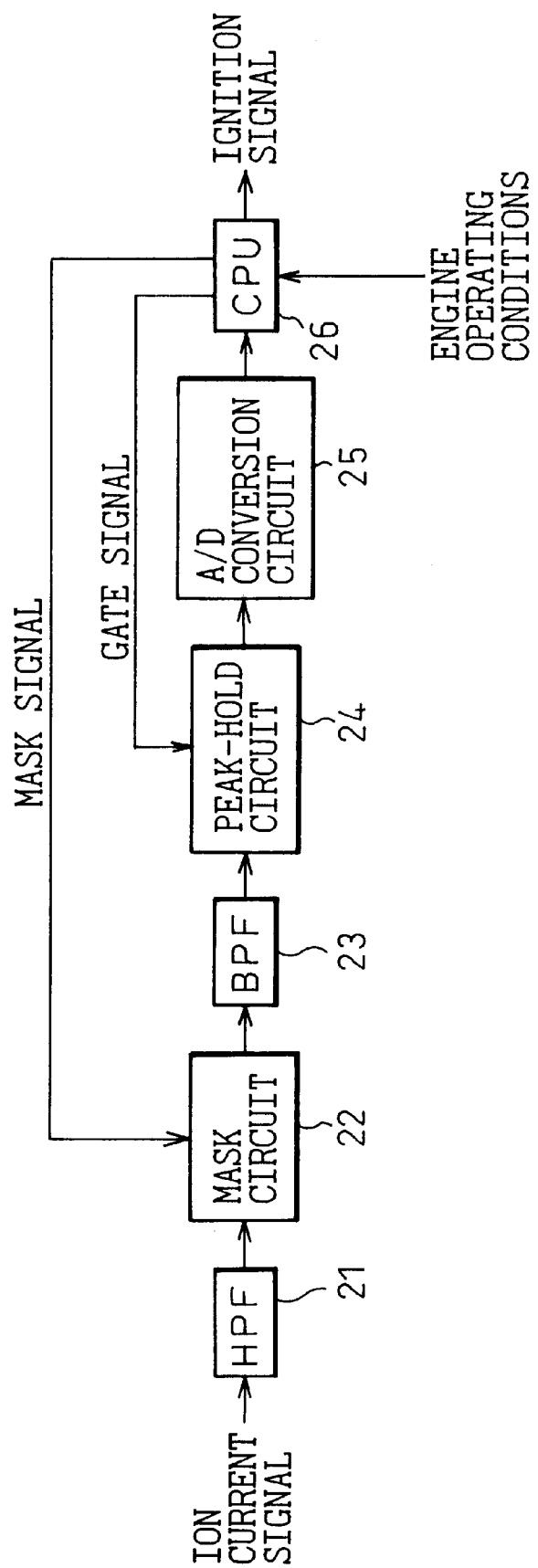

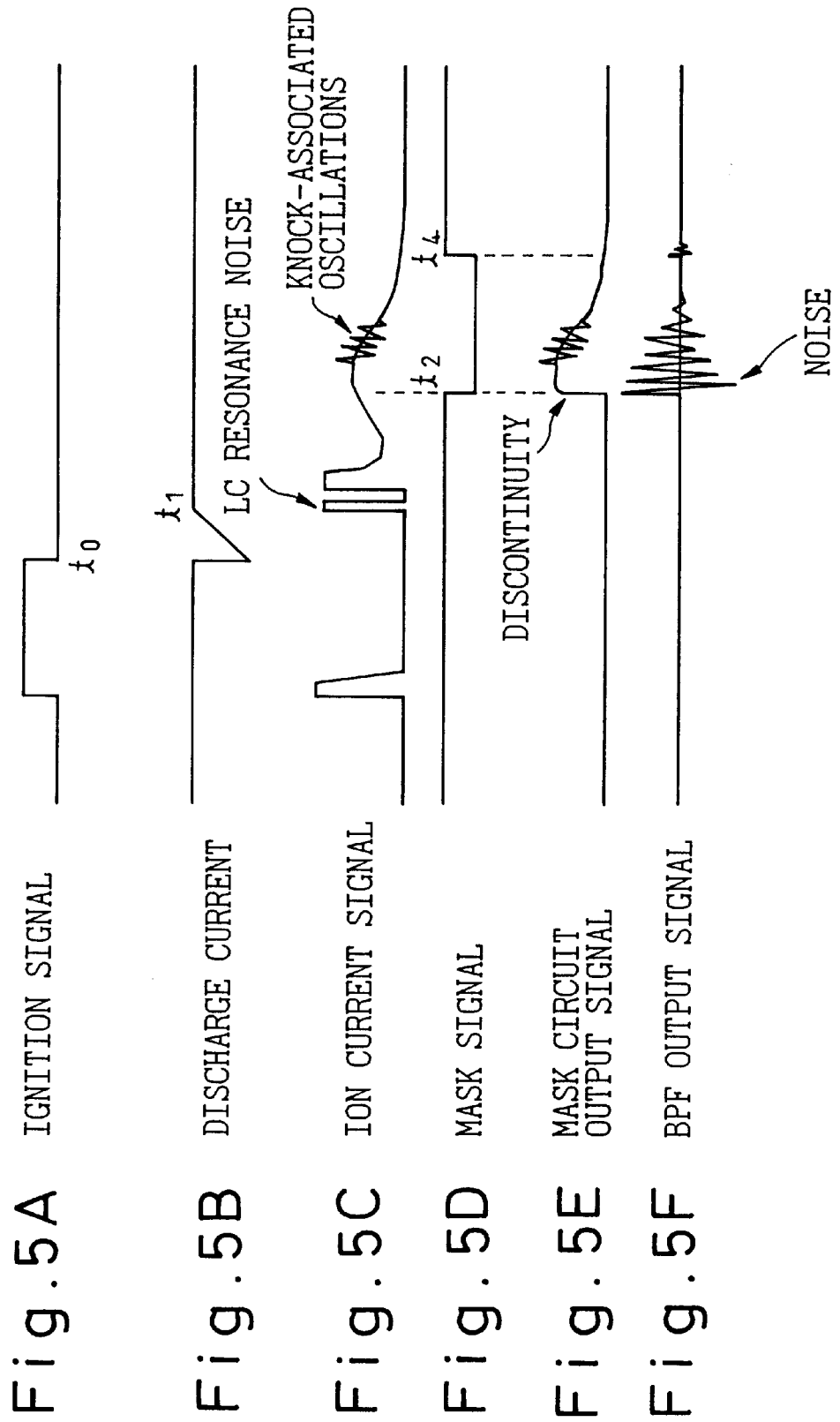

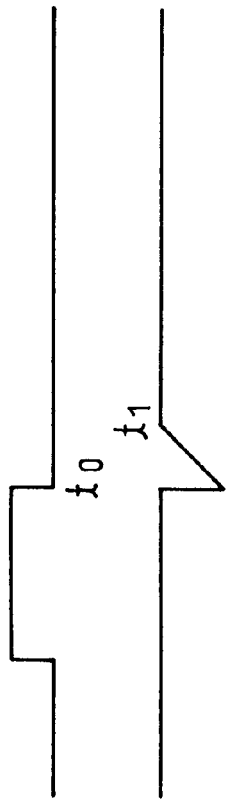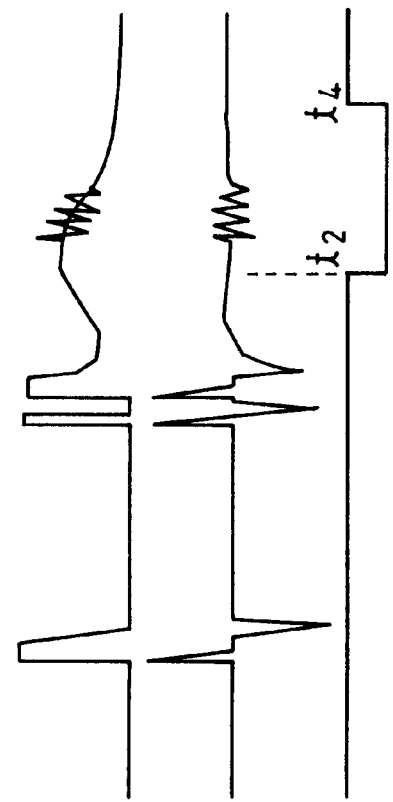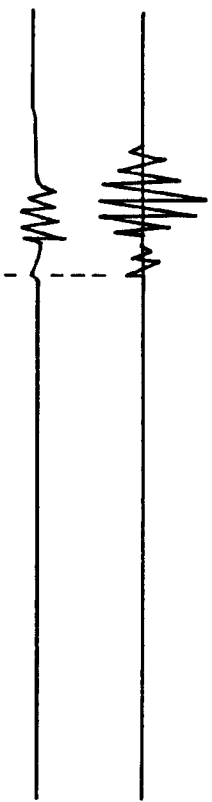
Fig. 6A  IGNITION SIGNAL
Fig. 6B  DISCHARGE CURRENT
Fig. 6C  ION CURRENT SIGNAL
Fig. 6D  HPF OUTPUT SIGNAL
Fig. 6E  MASK SIGNAL
Fig. 6F  MASK CIRCUIT OUTPUT SIGNAL
Fig. 6G  BPF OUTPUT SIGNAL

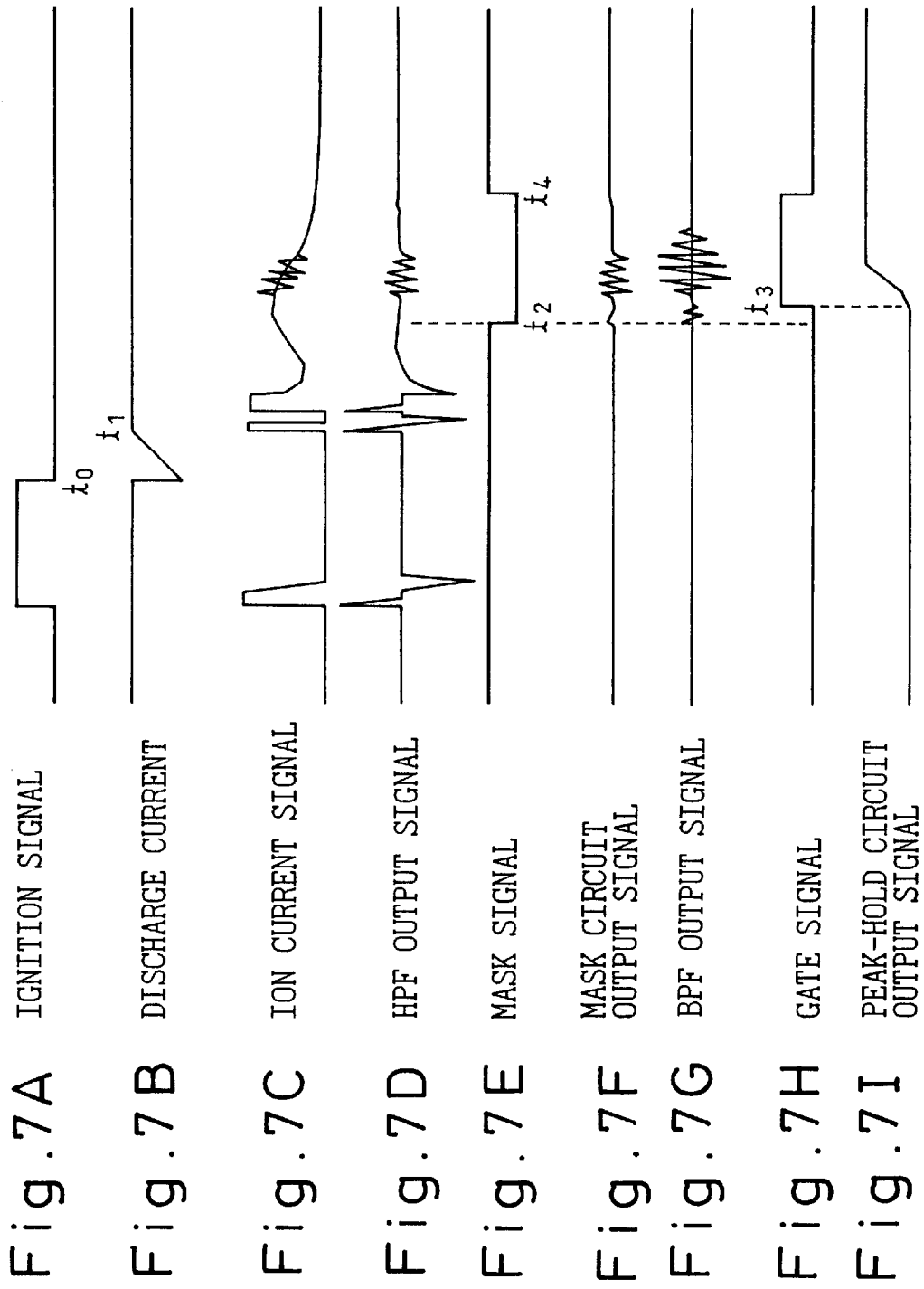

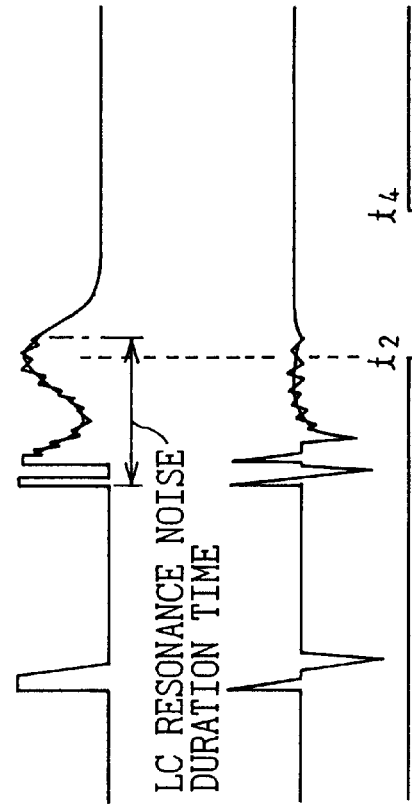
Fig. 8A  IGNITION SIGNAL
Fig. 8B  DISCHARGE CURRENT
Fig. 8C  ION CURRENT SIGNAL
Fig. 8D  HPF OUTPUT SIGNAL
Fig. 8E  MASK SIGNAL
Fig. 8F  MASK CIRCUIT OUTPUT SIGNAL
Fig. 8G  BPF OUTPUT SIGNAL

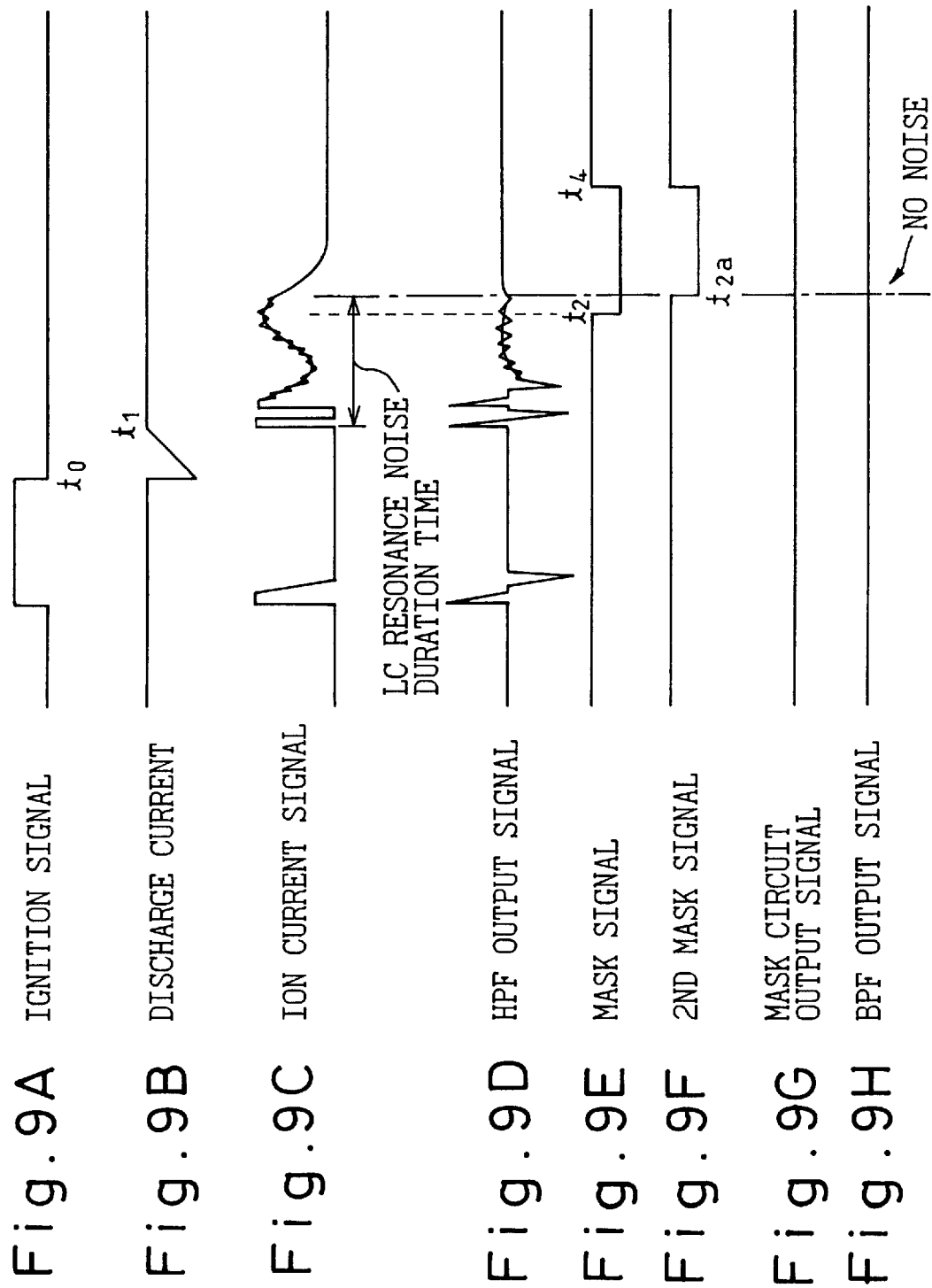

KNOCK DETECTION DEVICE FOR AN INTERNAL COMBUSTION ENGINE AVOIDING ERRONEOUS KNOCK DETECTION

BACKGROUND OF THE INVENTION

1. Field of the Invention

The present invention relates to a knock detection device for an internal combustion engine, and more particularly to a device for detecting engine knock based on an ion current inside an combustion chamber.

2. Description of the Related Art

In a gasoline engine, the air/fuel mixture in the vicinity of a spark plug is ignited by the spark produced at the spark plug, and gasoline combustion takes place with the ignited flame propagating throughout the entire air/fuel mixture. One abnormal combustion phenomenon that can occur at this time is knocking. Knocking is a condition in which unburned gases self-ignite before the flame front arrives, by an abnormally rapid rise in pressure during the flame propagation. When knock occurs, combustion gases oscillate, allowing heat to propagate more freely, and in some cases, engine damage may result. Knocking is closely related to ignition timing; as the ignition timing is advanced, maximum combustion pressure increases, increasing the tendency to knock.

On the other hand, it is desirable to increase the compression ratio in order to increase thermal efficiency and reduce fuel consumption. To achieve this, it is practiced, as part of ignition timing control, to advance the ignition timing up to the limit where knock is about to occur while detecting the occurrence of knock. Previously, in this kind of knock detection method, it was common practice to detect knock-induced vibrations using a vibration sensor attached to the cylinder block or like part, but in recent years, a knock detection method has been proposed that utilizes the change that occurs in an ion current inside a cylinder when knock occurs.

More specifically, when a spark is produced at the spark plug and air/fuel mixture burns in the combustion chamber, the air/fuel mixture is ionized. When a voltage is applied to the spark plug while the mixture is in the ionized state, an ion current flows. The occurrence of knock can be detected by detecting and analyzing this ion current. Usually, when knock occurs, an oscillating component of 6 kHz to 7 kHz appears in the ion current. The knock detection device based on the ion current extracts this frequency component peculiar to knock by means of a filter, and judges the knocking condition based on the magnitude of that component.

For example, Japanese Unexamined Patent Publication No. 4-136485 discloses a device in which a capacitor as an ion current generating source is charged to a given voltage by the secondary current that flows when the primary current of the ignition coil is shut off, and an ion current that flows, after a spark discharge, through a closed circuit consisting of the capacitor, the secondary winding of the ignition coil, the spark plug, and a current detecting resistor is measured. In such a device, since the secondary winding of the ignition coil (the secondary coil) is located in the ion current flow path, an LC resonant circuit is formed by its inductance L and the stray capacitance C associated with the coil and the spark plug. As a result, when an LC resonance current flows through the ion current path, the resonance current causes noise. To avoid such noise, the above prior art proposes that an ion current signal be masked during periods other than the period in which knock-induced oscillations appear.

However, when the ion current signal is masked during periods other than the period in which knock-induced oscillations appear, as in the above prior art, the ion current signal to which the masking has been applied will have a waveform that abruptly and discontinuously changes at the instant the mask is removed. Since such a steplike signal change has frequency components over a wide frequency range, some of the frequency components are passed unattenuated through a band-pass filter provided at a subsequent stage as a knock frequency component detection filter, and these frequency components cause noise. If such noise exists, an erroneous decision is made that knock has occurred when actually knock has not occurred.

The following problem also occurs. The period in which knock-induced oscillations appear depends on crankshaft angular position and corresponds, for example, to the position from 15° to 60° CA ATDC (crankshaft angle after top dead center). In a high engine rpm range, the time interval between the end of spark discharge and the start of knocking becomes short. On the other hand, the period in which LC resonance noise appears is substantially constant regardless of engine rpm, that is, a fixed period after the end of spark discharge. Therefore, at high engine rpm, the LC resonance noise period may overlap into the knock oscillation period. In that case also, an erroneous decision is made that knock has occurred when actually knock has not occurred.

SUMMARY OF THE INVENTION

In view of the above situation, it is an object of the present invention to provide a knock detection device capable of preventing erroneous decisions from being made due to the steplike signal change at the time of mask removal or to the overlap between the LC resonance generation and knock occurrence periods in high engine rpm conditions.

To accomplish the above object, according to a first aspect of the present invention, there is provided a knock detection device for an internal combustion engine, comprising: an ignition coil; switching means, connected to the primary of the ignition coil, for switching primary current on and off; a spark plug, connected to the secondary of the ignition coil, for igniting an air/fuel mixture in a cylinder by a high voltage induced in the ignition coil secondary when the primary current is switched off by the switching means; ion current detection means, forming an ion current path together with the ignition coil secondary and the spark plug, for applying a voltage to the spark plug and for detecting an ion current that flows through the spark plug due to ions generated in the cylinder when the air/fuel mixture burns; a high-pass filter for removing a low-frequency component from an output signal of the ion current detection means; signal mask means for masking an output signal of the high-pass filter during a period in which LC resonance noise can occur due to the inductance of the ignition coil secondary and a stray capacitance formed in the ion current path; a band-pass filter for extracting a knock frequency component from an output signal of the signal mask means; and knock determining means for determining the presence or absence of knock based on an output signal of the band-pass filter.

According to a second aspect of the present invention, preferably the knock determining means in the knock detection device according to the first aspect initiates peak-hold or integration operations on the output signal of the band-pass filter when a prescribed time has elapsed from the time the mask is removed by the signal mask means, the prescribed time being equal to the time required for noise associated with the mask removal to settle down, and the knock determining means determines that knock has occurred when the peak-hold value or integrated value exceeds a prescribed reference value.

According to a third aspect of the present invention, preferably the signal mask means in the knock detection device according to the first aspect removes the mask at timing when a crankshaft angular position where knock begins to occur is reached, or at timing when a time equal to the duration time of the LC resonance noise has elapsed from the end of spark discharge at the spark plug, whichever timing occurs later.

In the knock detection device for an internal combustion engine constructed according to the first aspect of the present invention, as described above, since the ion current signal is input to the mask means after removing the low-frequency component contained therein, the amount of the ion current signal change at the time of mask removal is reduced, thus serving to reduce the noise associated with the signal change. In the knock detection device for an internal combustion engine according to the second aspect of the present invention, since the knock signal processing at the subsequent stage is performed by avoiding the period in which a small amount of noise remains after the mask removal, the accuracy of knock detection is further enhanced. In the knock detection device for an internal combustion engine according to the third aspect of the present invention, the duration time of the LC resonance noise occurring after the end of spark discharge is taken into account, and processing for knock detection is performed based on a signal activated after the duration time; as a result, there is no possibility of making an erroneous decision even in a high engine rpm range where the LC resonance occurrence period may overlap into the knock occurrence period.

BRIEF DESCRIPTION OF THE DRAWINGS

Further features and advantages of the present invention will be apparent from the following description with reference to the accompanying drawings, in which:

FIG. 4 is a diagram showing the configuration of a processing circuit in the knock detection device;

FIGS. 5A, 5B, 5C, 5D, 5E, and 5F are timing charts of various signals for explaining what kind of trouble would occur in performing knock detection based on an ion current if a high-pass filter were not provided in the processing circuit;

FIGS. 6A, 6B, 6C, 6D, 6E, 6F, and 6G are timing charts of the various signals when a high-pass filter is provided in the processing circuit;

FIGS. 7A, 7B, 7C, 7D, 7E, 7F, 7G, 7H, and 7I are timing charts of the various signals for explaining how a gate period is set in a peak-hold circuit;

FIGS. 8A, 8B, 8C, 8D, 8E, 8F, and 8G are timing charts of the various signals for explaining the problem that can arise when a mask period is set as a fixed period in terms of crankshaft angle; and FIGS. 9A, 9B, 9C, 9D, 9E, 9F, 9G, and 9H are timing charts of the various signals according to an embodiment wherein an improvement is made with respect to mask removal timing.

DESCRIPTION OF THE PREFERRED EMBODIMENTS

The preferred embodiments of the present invention will be described below with reference to the accompanying drawings.

Figure 1:
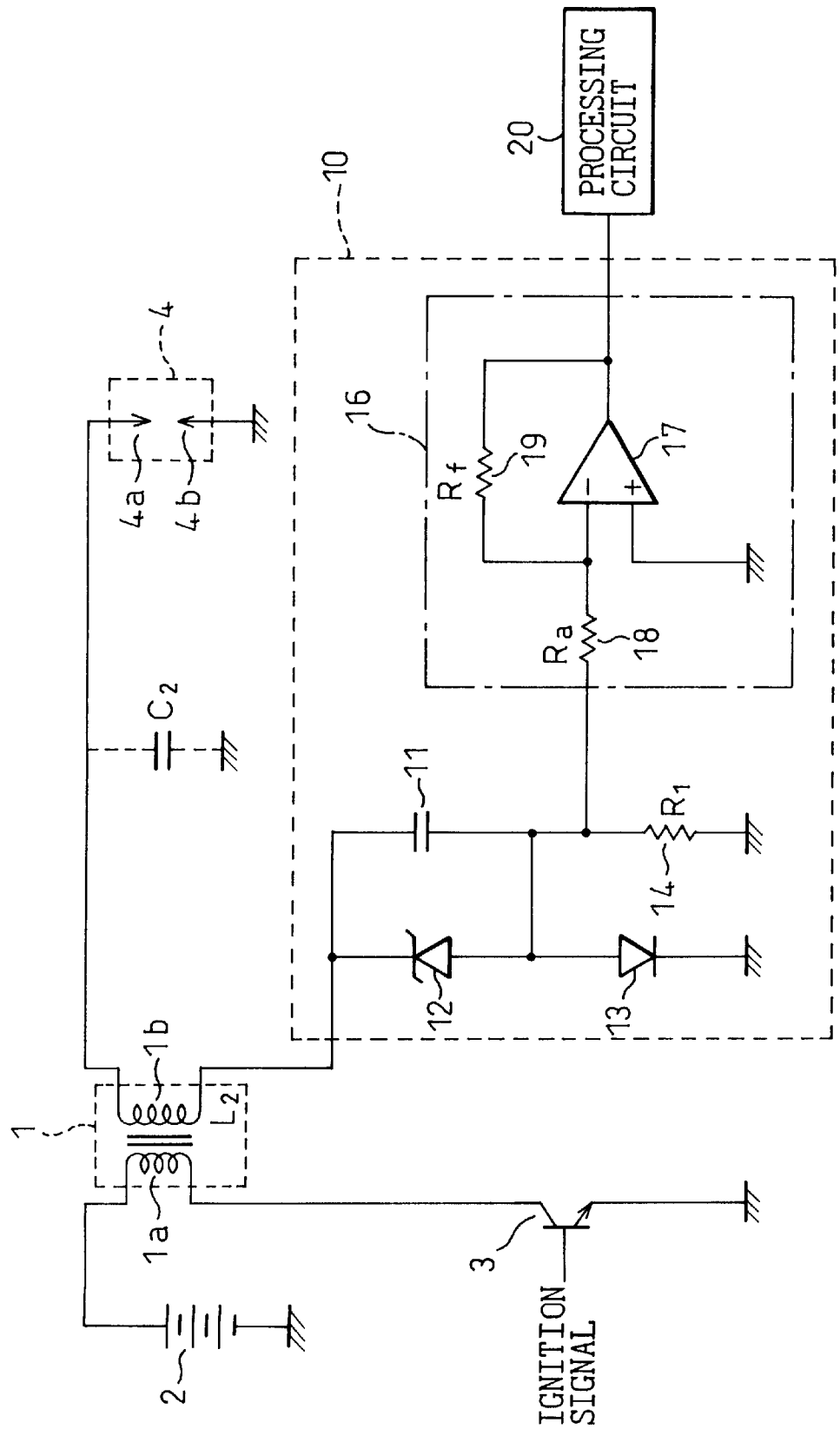
FIG. 1 is a diagram showing the circuit configuration of a knock detection device according to one embodiment of the present invention.

FIG. 1 is a diagram showing the circuit configuration of an ignition device and a knock detection device according to one embodiment of the present invention. One end of the primary winding 1a of an ignition coil 1 is connected to the positive electrode of a battery 2, and the other end thereof is connected to the collector of a transistor 3 as a switching means. The emitter of the transistor 3 is grounded, and an ignition signal is applied to its base. One end of the secondary winding 1b of the ignition coil 1 is connected to the center electrode 4a of a spark plug 4. The outer electrode 4b of the spark plug 4 is grounded.

An ion current detection circuit 10 is provided at the other end of the secondary winding 1b of the ignition coil 1. A capacitor 11 as an ion current generating source is connected to the secondary winding 1b. Connected in parallel with this capacitor 11 is a voltage-regulator diode (Zener diode) 12 by which the voltage to be charged into the capacitor 11 by the ignition coil secondary current is limited to within a specified value. The other end of the capacitor 11 is grounded via a diode 13 which passes current to the ground, and is also grounded via an ion current detecting resistor 14.

The node between the capacitor 11 and the ion current detecting resistor 14 is connected to an inverting amplifier circuit 16. This inverting amplifier circuit 16 consists of an operational amplifier 17 whose noninverting input terminal (+ terminal) is grounded, an input resistor 18 connected to the inverting input terminal (− terminal) of the operational amplifier 17, and a feedback resistor 19 directed from the output terminal to the inverting input terminal (− terminal) of the operational amplifier 17. Denoting the resistance value of the input terminal 18 by $R_a$ and that of the feedback resistor 19 by $R_f$, the voltage amplification gain is given by $-R_f/R_a$, as is well known. The output of the inverting amplifier circuit 16 is directed to a processing circuit 20 which performs signal processing for knock determination, etc. Here, $R_a$ and $R_f$ are very large values compared with the resistance value $R_1$ of the ion current detecting resistor 14.

Figure 2:
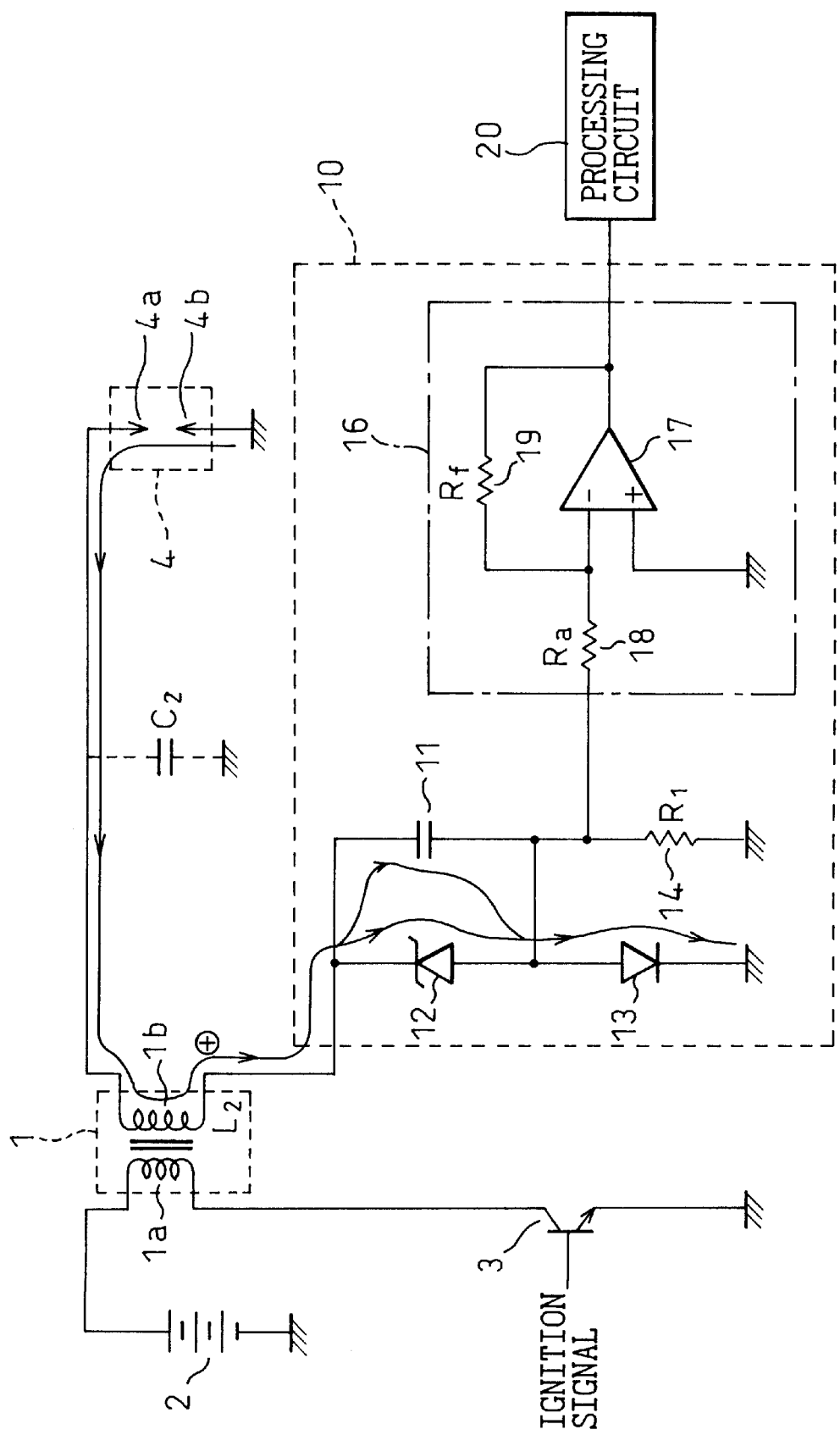
FIG. 2 is a diagram for explaining the flow of a discharge current when a spark discharge occurs at a spark plug.

Next, the operation of the ion current detection circuit 10 will be described. First, when the ignition signal goes high and the transistor 3 is turned on, a current flows through the primary winding 1a of the ignition coil. Next, when the ignition signal is set low and the transistor 3 is turned off, the primary current is shut off, inducing a high voltage in the secondary winding 1b of the ignition coil 1 and thus causing a spark to occur at the spark plug 4. That is, when a high negative voltage is applied to the center electrode 4a of the spark plug 4, an electric arc or spark is produced between the center electrode 4a and the outer electrode (ground electrode) 4b, and a current flows from the secondary winding 1b of the ignition coil, the current flowing back to the secondary winding 1b through the capacitor 11, the voltage-regulator diode 12, the diode 13, and the spark plug 4, as shown in FIG. 2. During this process, the capacitor 11 is charged to a voltage equal to the Zener voltage (about 100 volts) of the voltage-regulator diode 12.

Figure 3:
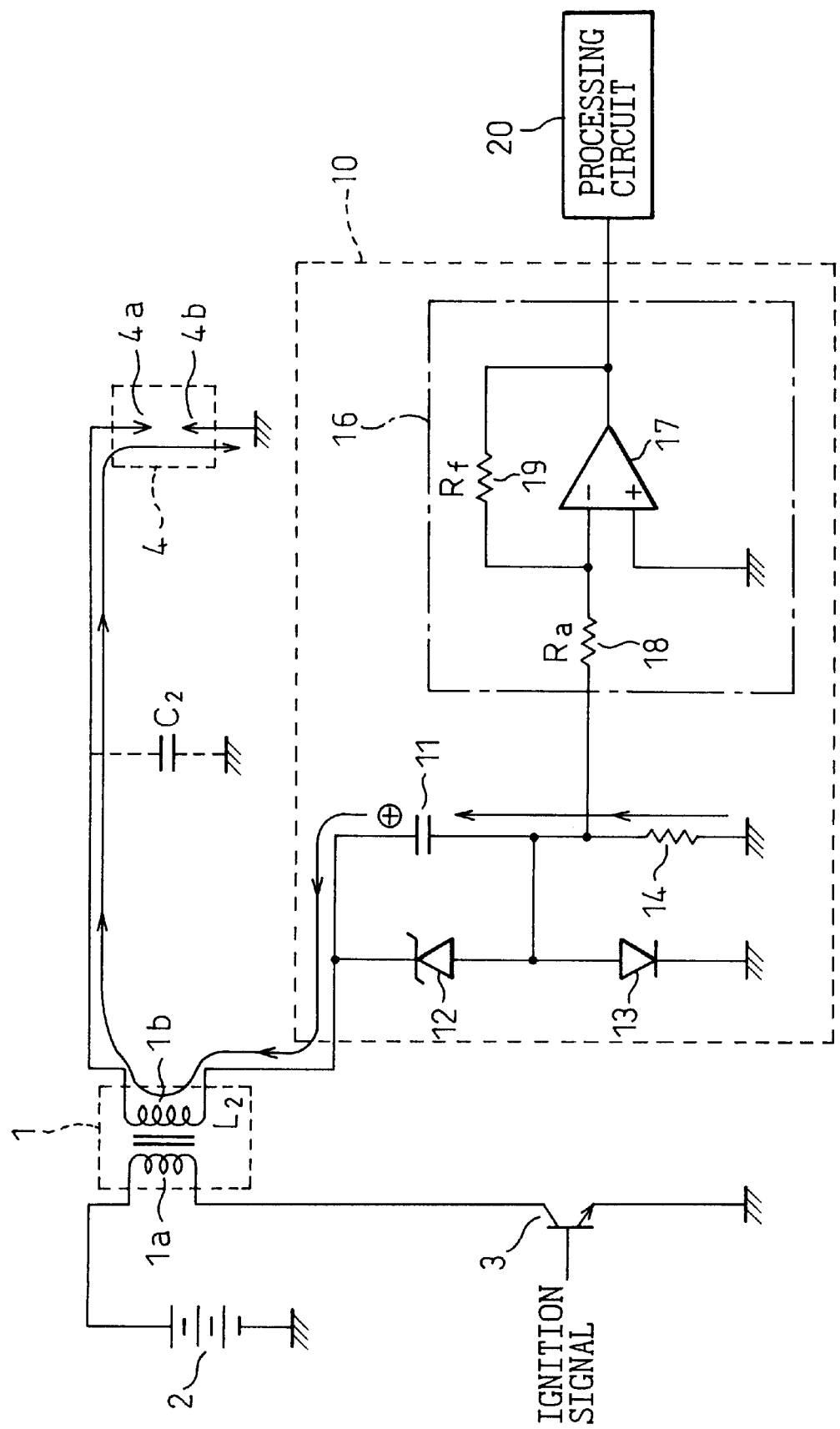
FIG. 3 is a diagram for explaining the flow of an ion current after the spark discharge.

When the air/fuel mixture inside the combustion chamber is burned after being ignited by the spark at the spark plug 4, the air/fuel mixture is ionized. When the mixture is in the ionized state, conductivity is maintained across the gap between the two electrodes of the spark plug 4. Furthermore, since a voltage is applied between the two electrodes of the spark plug 4 by the charged voltage of the capacitor 11, an ion current flows. This ion current flows from one end of the capacitor 11 and back to the other end thereof passing through the ignition coil secondary winding 1b, the spark plug 4, and the ion current detecting resistor 14, as shown in FIG. 3. Then a voltage equal to −(ion current value)× detecting resistor value appears at the node between the ion current detecting resistor 14 and the capacitor 11, and this voltage is inverted and amplified by the inverting amplifier circuit 16. Finally, the output of the inverting amplifier circuit 16 is supplied as an ion current signal to the processing circuit 20.

FIG. 4 is a block diagram showing the configuration of the processing circuit 20. In the figure, reference numeral 21 designates a high-pass filter (HPF) which accepts at its input the ion current signal output from the inverting amplifier circuit 16 and removes low-frequency components contained therein. The provision of the HPF 21 constitutes one feature of the present invention; the necessity of this filter will be explained later. Reference numeral 22 indicates a mask circuit which masks the output signal of the HPF 21 during an active period of a mask signal supplied to it. Further, reference numeral 23 denotes a band-pass filter (BPF) which accepts the output signal of the mask circuit 22 at its input and extracts the frequency component peculiar to knock (hereinafter called the knock frequency) from the input signal. Reference numeral 24 indicates a peak-hold circuit which detects and holds the peak value of the output signal of the BPF 23 during an active period of a gate signal supplied to it. An integrator circuit may be used instead of the peak-hold circuit.

Reference numeral 25 designates an A/D conversion circuit which converts an analog output voltage from the peak-hold circuit 24 into a digital output voltage. Finally, reference numeral 26 shows a central processing unit (CPU) which performs ignition timing control operations including knock control. The CPU 26 determines that knock has occurred, based on the output signal of the A/D conversion circuit 25, when the value of that signal exceeds a reference value. Then, based on outputs from various sensors, the CPU 26 detects various engine operating conditions, comprehensively judges the engine condition as well as the presence or absence of knock, determines optimum ignition timing, and outputs an ignition signal. The CPU 26 also determines the mask period in the mask circuit 22 and the gate period in the peak-hold circuit 24, and supplies the mask signal to the mask circuit 22 and the gate signal to the peak-hold circuit 24.

FIGS. 5A, 5B, 5C, 5D, 5E, and 5F are timing charts of the various signals for explaining what kind of trouble would occur in performing knock detection based on the ion current if the HPF 21 were not provided. As shown in FIGS. 5A and 5B, at the instant the ignition signal is turned off (at $t_0$), a spark discharge occurs at the ignition plug 4 and a discharge current flows. Then, after the end of the spark discharge (at $t_1$), the ignition coil attempts to discharge residual magnetic energy, as a result of which LC resonance occurs between the inductance $L_2$ of the ignition coil secondary winding 1b and the stray capacitance $C_2$ (see FIG. 1) formed in the high voltage line, and an LC resonance current flows. Since this LC resonance current is detected by the ion current detecting resistor, an abrupt change appears in the ion current waveform after the end of the spark discharge, as shown in FIG. 5C, but this change is not due to the ion current, but represents residual magnetic noise (LC resonance noise).

After the LC resonance current due to the residual magnetic energy flows, the ion current flows. In high load operating conditions, a low-frequency signal synchronized to the cylinder pressure appears in the ion current signal. When knock occurs at this time, oscillations associated with the knock are superimposed on the wave portion after the crest, that is, after the maximum cylinder pressure (usually, at or near 15° CA ATDC) is reached.

Therefore, to extract only the knock oscillation component from the ion current signal, only the signal during the period in which the knock-associated oscillations appear should be extracted and filtered. The period in which the knock-associated oscillations appear remains relatively constant in terms of crankshaft angle regardless of engine rpm, and corresponds substantially to the crankshaft angular position from 15° to 60° CA ATDC. Therefore, as shown in FIG. 5D, the mask signal to be supplied to the mask circuit 22 is set so that the mask circuit 22 allows the ion current signal to pass therethrough unchanged during the period from 15° to 60° CA ATDC (from $t_2$ to $t_4$) and masks the ion current signal during other periods.

In this case, the mask circuit output signal changes discontinuously at the instant the mask is removed (at $t_2$), as shown in FIG. 5E. This steplike signal change has frequency components over a wide frequency range; therefore, as shown in FIG. 5F, some of the frequency components are passed unattenuated through the BPF 23 provided as a knock frequency component detection filter at the subsequent stage, and these frequency components causes noise. If such noise exists, an erroneous decision is made that knock has occurred when actually knock has not occurred.

FIGS. 6A, 6B, 6C, 6D, 6E, 6F, and 6G are timing charts of the various signals when the HPF 21 is provided in front of the mask circuit 22 in order to solve the above problem. The signal waveforms in FIGS. 6A, 6B, 6C, and 6E are the same as the signal waveforms shown in FIGS. 5A, 5B, 5C, and 5D, respectively. When the ion current signal is passed through the HPF 21, the HPF output signal has a flat waveform with the low-frequency component removed, as shown in FIG. 6D. When this HPF output signal is supplied to the mask circuit 22, the discontinuity occurring in the mask circuit output signal at the time of mask removal is appreciably reduced as shown in FIG. 6F. As a result, the noise introduced in the output signal of the BPF 23 is reduced to such a level that does not affect knock detection, and knock detectability thus improves.

FIGS. 7A, 7B, 7C, 7D, 7E, 7F, 7G, 7H, and 7I are timing charts of the various signals for explaining how the gate period is set in the peak-hold circuit 24. Here, the signal waveforms in FIGS. 7A to 7G are the same as the signal waveforms shown in FIGS. 6A to 6G, respectively. As described above, even when the HPF 21 is provided, the signal discontinuity associated with the mask removal cannot be completely eliminated, and a small amount of noise remains in the output signal of the BPF 23. To address this, in the present invention, the timing ($t_3$) for asserting the gate signal, which is used to specify the period during which the signal peak is to be held in the peak-hold circuit 24, is slightly delayed with respect to the mask removal timing ($t_2$), as shown in FIG. 7H, to remove the noise associated with the mask removal and enhance the accuracy of knock judgement. By so doing, noise effects can be prevented from appearing in the output signal of the peak-hold circuit, as shown in FIG. 7I. Here, the amount of delay may be set either in terms of time or in terms of crankshaft angle.

Next, an embodiment directed toward improving the mask removal timing will be described. FIGS. 8A, 8B, 8C, 8D, 8E, 8F, and 8G are timing charts of the various signals for explaining the problem that can arise when the mask period is set as a fixed period in terms of crankshaft angle. In some cases a situation may occur where, after the abrupt LC resonance current has passed due to the ignition coil residual magnetic energy, a greatly varying ion current flows through the ignition coil, triggering the generation of a very small LC resonance, and this very small LC resonance current is superimposed as noise on the ion current signal, as shown in FIG. 8C. The LC resonance noise continues for a fixed length of time after the end of the spark discharge ($t_1$), regardless of engine rpm.

On the other hand, the period in which the knock-associated oscillations appear depends on crankshaft angular position, and corresponds, for example, to the position from 15° to 60° CA ATDC, as previously described. At high engine rpm, the time interval from the spark initiation and combustion to the occurrence of knock becomes short, and hence, the time interval from the end of the spark discharge ($t_1$) to the start of the knock period (15° CA ATDC) becomes short. As a result, at high engine rpm, there arises a possibility that the LC resonance noise may continue into the knock oscillation period. More specifically, the LC resonance noise may remain in the HPF output signal after the mask removal timing ($t_2$), as shown in FIGS. 8D and 8E, and as a result, noise may be introduced into the mask circuit output signal and the BPF output signal, as shown in FIGS. 8F and 8G.

FIGS. 9A, 9B, 9C, 9D, 9E, 9F, 9G, and 9H are timing charts of the various signals according to the embodiment that solves the above problem by improving the mask removal timing. The signal waveforms in FIGS. 9A to 9E are the same as the signal waveforms shown in FIGS. 8A to 8E, respectively. In this embodiment, in addition to the mask signal (FIG. 9E) used to direct that the mask be removed during a fixed period corresponding to a predetermined crankshaft angular position range (for example, 15° to 60° CA ATDC), a second mask signal (FIG. 9F) is provided that is used to direct that the mask be removed at time ($t_{2a}$) when a prescribed time has elapsed from the end of the spark discharge ($t_1$), the prescribed time being equal to the time required for the LC resonance noise to settle down. Here, the end of the spark discharge ($t_1$) can be detected as the rise timing of the residual magnetic noise (LC resonance noise).

The mask circuit 22 is configured to pass the input signal unchanged only during the period when the two mask signals shown in FIGS. 9E and 9F are both inactive. As a result, even in situations where the LC resonance noise continues into the knock occurrence period, the possibility of introducing noise into the mask circuit output signal is eliminated, as shown in FIG. 9G, and therefore, the BPF output signal also is free from noise, as shown in FIG. 9H.

When the mask signal considering the LC resonance noise duration time is provided, as described above, it is possible that knock detectability will degrade since the beginning portion of the knock oscillations is masked, but in reality, if a portion of the knock oscillations is masked, the BPF will respond satisfactory, that is, the detectability degradation in this case is well within allowable limits compared with the detectability degradation due to noise.

In the above-described embodiment, the mask removal timing ($t_{2a}$) considering the LC resonance noise duration time has been set relative to the end of the spark discharge ($t_1$), but instead, it may be set relative to the ignition timing ($t_0$). The reason is that the spark duration time ($t_1-t_0$) also is relatively unaffected by engine rpm and can therefore be treated as a fixed time. More precisely, however, the spark duration time varies significantly between ignition cycles, and the fixed time must be set a little longer in view of the variation. Since the mask removal timing is delayed correspondingly, the latter case may be at some disadvantage compared with the case where the timing is set relative to the end of the spark discharge.

As described above, according to the present invention, a knock detection device is provided that is capable of preventing erroneous decisions from being made due to the steplike signal change at the time of mask removal or to the overlap between the LC resonance generation and knock occurrence periods in high engine rpm conditions. More specifically, according to the first aspect of the present invention, since the ion current signal is input to the mask means after removing the low-frequency component contained therein, the amount of the ion current signal change at the time of mask removal is reduced, thus serving to reduce the noise associated with the signal change. According to the second aspect of the present invention, since knock signal processing is performed by avoiding the period in which a small amount of noise remains after the mask removal, the accuracy of knock detection is further enhanced. According to the third aspect of the present invention, the duration time of the LC resonance noise occurring after the end of spark discharge is taken into account, and processing for knock detection is performed based on a signal activated after the duration time; this ensures a high knock detection accuracy even in high engine rpm conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A knock detection device for an internal combustion engine, comprising:

an ignition coil;

switching means, connected to the primary of said ignition coil, for switching primary current on and off;

a spark plug, connected to the secondary of said ignition coil, for igniting an air/fuel mixture in a cylinder by a high voltage induced in said ignition coil secondary when said primary current is switched off by said switching means;

ion current detection means, forming an ion current path together with said ignition coil secondary and said spark plug, for applying a voltage to said spark plug and for detecting an ion current that flows through said spark plug due to ions generated in the cylinder when the air/fuel mixture burns;

a high-pass filter for removing a low-frequency component from an output signal of said ion current detection means;

signal mask means for masking an output signal of said high-pass filter during a resonance period in which LC resonance noise can occur due to the inductance of said ignition coil secondary and a stray capacitance formed in said ion current path, wherein said signal mask means removes said mask at a one of a timing when a crankshaft angular position where knock begins to occur is reached and a timing at which a time elapsed since the end of spark discharge from the spark plug is equal to a duration of the resonance period, and wherein said signal mask means removes said mask at the later of these timings;

a band-pass filter for extracting a knock frequency component from an output signal of said signal mask means; and knock determining means for determining the presence or absence of knock based on an output signal of said band-pass filter.

* * * * *